United States Patent Office 3,043,458
Patented July 10, 1962

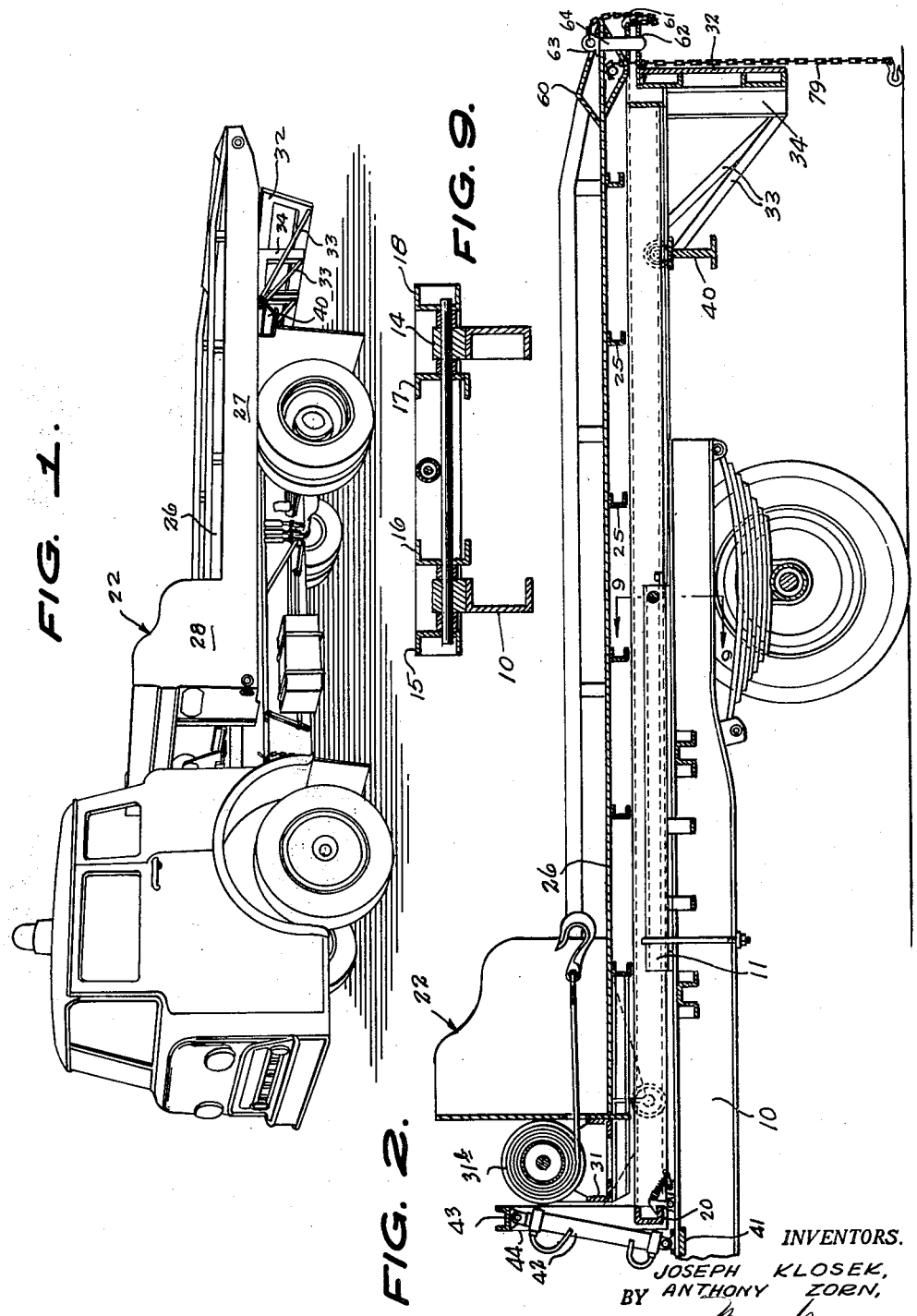

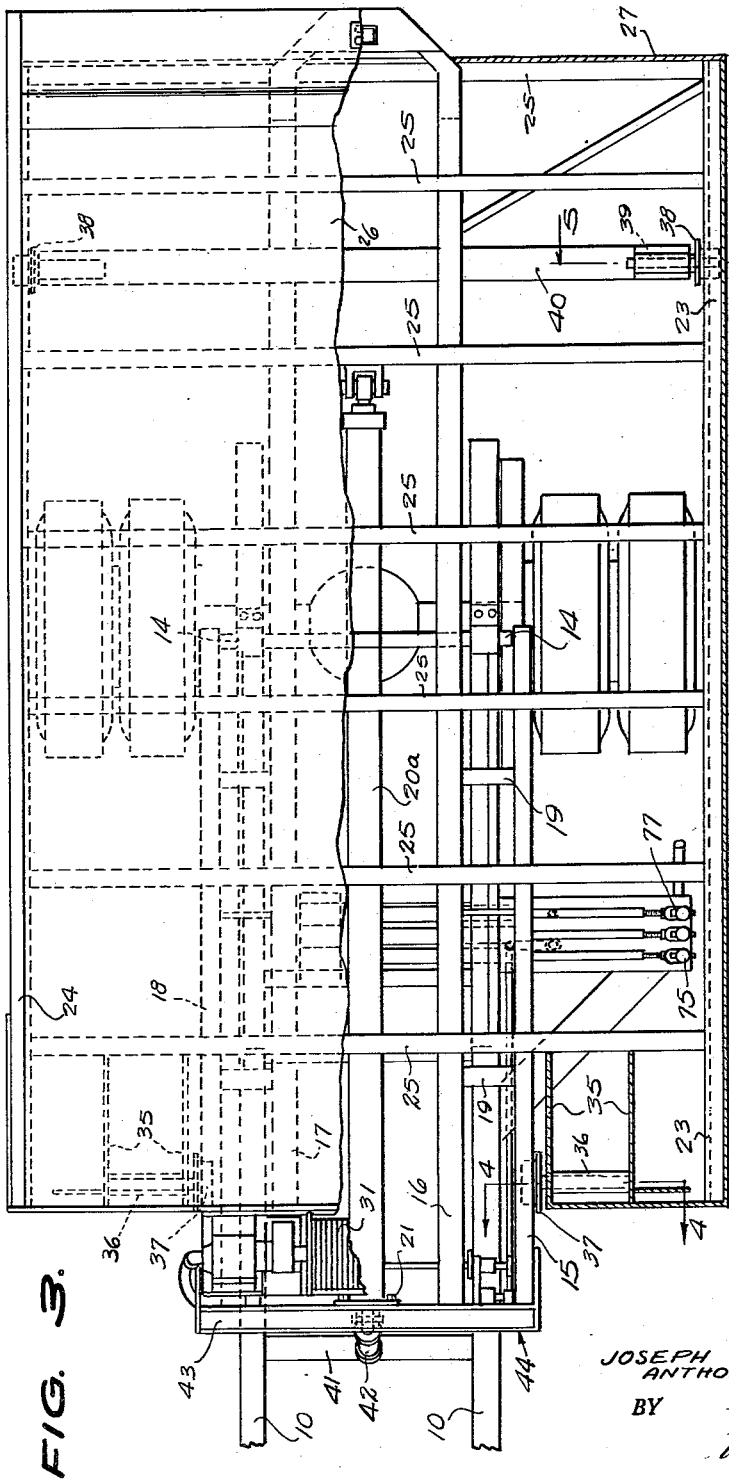

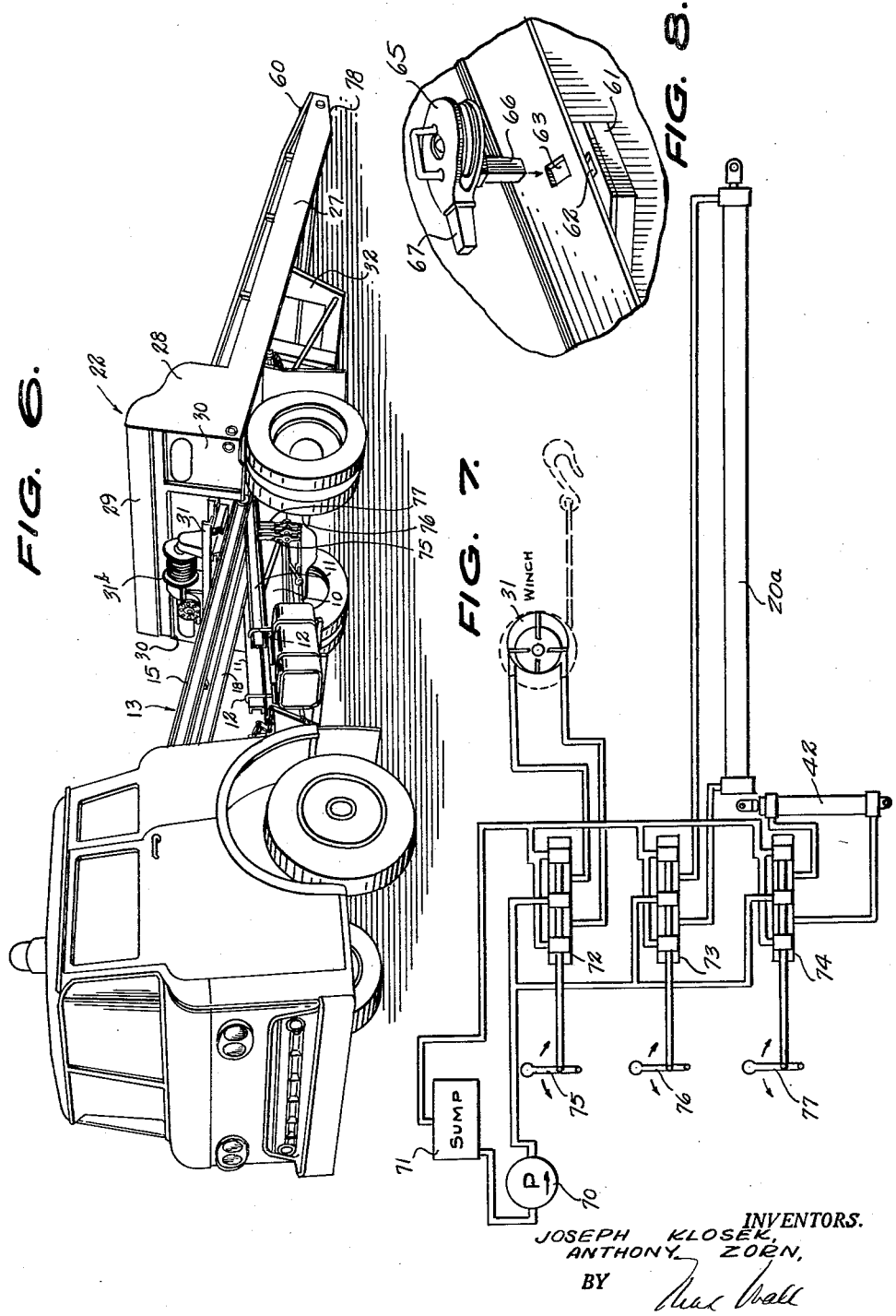

3,043,458
VEHICLE FOR TOWING AND TRANSPORTING LOADS
Joseph Klosek, Utica, and Anthony Zorn, Oriskany, N.Y., assignors to Oriskany Garage, Inc., West Utica, N.Y., a corporation of New York
Filed Sept. 17, 1958, Ser. No. 761,508
4 Claims. (Cl. 214—505)

This invention relates to that type of vehicle known as a wrecking truck or tow truck. Vehicles of this type in common use customarily are equipped with derricks or hoists of various kinds for use in lifting and towing other vehicles damaged in accidents or otherwise. However, such trucks have a limited range of use in that the towed vehicle must have a pair of usable wheels upon which it may be towed. Such trucks are not equipped to handle and transport a vehicle which is so badly damaged that it cannot be towed. A primary object of this invention, therefore, is to provide such a truck which can handle, that is, load and transport, a damaged vehicle, regardless of the extent of the damage.

Another object of the invention is the provision of such a truck which eliminates the necessity for towing a damaged vehicle, the truck being capable of self-loading a vehicle or other type of load.

Another object of the invention is the provision of such a truck with a tiltable platform, in which the platform or body of the truck can be raised at an angle with respect to the ground and then lowered at said angle until the rear end of the platform rests upon the ground, thereby forming a ramp upon which a load may be wheeled, skidded or otherwise placed thereon. With the load in place, the platform may then be raised back upon the truck and lowered to its original, horizontal position on the chassis.

Another object is to provide such a truck which can be completely handled by one operator and the control mechanism therefor is conveniently provided in one place at the side of the truck so that one operator can control all functions from a position at the side where he can watch performance.

A further object of the invention is the provision of a novel rear bumper arrangement in which said rear bumper serves as a support for the platform intermediate its ends when the platform is in tilted, ramp position to take on a load.

A further object of the invention is the provision of a front extension on the platform to support a winch, so that the winch may be moved with the platform. In the known prior art, the winch has always been fixed to the chassis so that it was necessary to bend the cable over one or more pulleys before it could be extended out to the load, thus increasing the drag on the motor. In the present arrangement, this drag is eliminated, the cable extending directly from the winch to the load, except when the load is to one side of the truck. When the load is at one side of the truck in a place inaccessible to the truck, means are provided for expeditiously attaching a snatch block thereto so that the cable may be bent off to one side to drag the load to the rear end of the truck.

Still a further object of the invention is the provision of a tilting frame on the chassis of a truck, said frame serving as a track upon which the body or platform of the truck may be movably mounted so that the body or platform may be raised and lowered with respect to the truck chassis to assume a ramp position with respect to the ground to take on a load, whereupon the body or platform with the load may be raised to horizontal position upon the truck chassis.

Further objects and advantages will be apparent from the accompanying specification and drawings, wherein a preferred embodiment of the invention is described and delineated for the purposes of illustration.

FIGURE 1 is a perspective view of the truck according to this invention.

FIGURE 2 is an enlarged elevational detail with parts shown in section.

FIGURE 3 is a plan view of the body portion of the truck, with parts broken away and parts shown in section.

FIGURE 4 is a vertical, sectional detail taken along the line 4—4 of FIGURE 3.

FIGURE 5 is a vertical, sectional detail taken along the line 5—5 of FIGURE 3.

FIGURE 6 is a perspective view of the truck with the platform thereof shown in loading position.

FIGURE 7 is a schematic view of the hydraulic system for controlling the operation of the tilting frame platform and winch.

FIGURE 8 is a perspective view of a combined rigging and platform locking detail.

FIGURE 9 is a sectional view taken along the line 9—9 of FIGURE 2 showing how the tilting frame is pivoted to the chassis.

The invention is embodied in a conventional commercial type vehicle such as a truck having a conventional chassis frame comprising laterally spaced longitudinally extending channel members 10 suitably connected by transverse members (not shown). The flanges on these channel members are turned inwardly or towards each other. Upon this chassis additional channel members 11, of a smaller size, are secured by U-bolts 12 (only two of which are shown). The flanges of these channels are turned outwards from each other, or in a direction opposite to those of the channel members 10. A tilting frame, generally indicated at 13, is pivoted to the chassis at 14 (FIGURE 9). This frame comprises four longitudinally extending chanel members 15, 16, 17, 18, these being connected in pairs on each side of a median line drawn longitudinally midway between the channels 10. The channels 15, 16 are thus connected intermediate their ends by transverse struts 19 (only a few of which are shown in FIGURE 3) and the channels 17, 18 are similarly connected. All four channels are joined together at their ends by transverse channels 20 (only one of which is shown in FIGURE 2). This frame is thus supported on its pivot 14 at its rear end and rests on the truck chassis at its forward end, the channels 11 lying between the respective pairs of channels 15 and 16, 17 and 18. The outermost longitudinally extending channels 15 and 18 have their flanges facing outwardly of the truck on each side thereof.

An hydraulic cylinder 20a is suitably permanently secured at one end to the forward transverse bar of the tilting frame at 21, intermediate the channels 16 and 17, and the cylinder extends rearwardly of the truck for connection with the platform of the truck, about to be described. The body of the truck, generally indicated at 22, comprises a frame of longitudinal structural members 23, 24, joined together and reinforced by a plurality of transverse structural members 25. A platform bed or floor 26 is suitably secured to these structural members, the floor extending the full length and width of the body as shown in FIGURE 3. The body is finished by side plates 27 skirting the sides and back and secured suitably to the longitudinal members 23, 24, and to the rearmost transverse member 25, respectively. The side plates 27 have upward extensions 28 at their forward ends, forming partial side walls for the platform. The front of the platform is partially closed by transverse plate 29 which connects the side walls 28 and by two end plates 30 which are joined to the transverse plate and the side walls 28, by welding or otherwise.

On a level with the bed or platform 26, at the forward end thereof a supporting frame 31 is suitably made of structural members and secured to the forward extensions of the intermediate frame channels 16, 17. A winch 31b, suitably hydraulically controlled, is mounted on this frame and thus moves with the platform when the platform moves.

The tilting frame 13 has a stiffening leg and bumper 32 extending downwardly from the rear end thereof substantially at a right angle thereto across practically the width of the truck. This leg is fabricated of heavy structural members and is welded or otherwise secured to the frame 13. It is strongly braced and reinforced by a plurality of braces 33, 34 which are secured to the leg at one end and at the other end to the tilting frame. As the front end of the frame 13 reaches the upper limit of its tilting movement as will be described, the rear end is lowered until the bottom edge of the leg rests upon the ground or pavement.

The platform or body 22 is supported on rollers so as to be capable of longitudinal movement with respect to the tilting frame. The forward portion of the bed 26 of the platform has plates 35, FIGURE 4, welded to its underside on each side of the tilting frame, these plates extending downwardly to support a bearing 36 in which the roller 37 is journalled. These rollers, one on each side, extend inwardly of the sides of the platform and rest upon the bottom flange of the adjacent channels 15 and 18 of the tilting frame, as shown in FIGURE 3. The rear ends of the platform channels 23, 24, rest upon rollers 38 which are journalled in bearings 39 supported on a cross member 40 carried by the rear end of the tilting frame 13.

Just forwardly of the tilting frame and behind the cab of the truck, a cross bar 41 is supported by the chassis members 10, FIGURES 2 and 3. Midway of this cross bar, one end of an hydraulic cylinder 42 is fixed so as to extend in a vertical plane and inclined slightly rearwardly, the piston rod thereof being connected to the cross bar 43 of a rectangular frame 44 supported in a vertical position at the forward end of the tilting frame, this arrangement being for the purpose of raising the platform, as will be described.

The top of the bed 26, along its rear edge, has a ramp 60 which is provided to raise the rear wheels of a vehicle being loaded to prevent the rear bumper, exhaust pipe and other low-slung apparatus or accessories from being damaged by contact with the road surface when the front end of the vehicle is raised in its travel along the bed of the truck as it is being loaded. The sharp angle thus assumed by the loaded vehicle causes the rear bumper and exhaust pipe of modern low-slung cars to drag on the road surface and the ramp is designed to prevent such damage. As an additional safety measure, a rear extension 61 of the tilting frame 13 has an opening 62, preferably square, which is in vertical alignment with a similar opening 63 in the bed of the platform. A heavy pin 64 is inserted in these holes to prevent relative movement between the tilting frame and platform under driving conditions. As an accessory, a snatch block 65, FIGURE 8, is provided, having a downwardly projecting square shank 66 and a laterally extending similar shank 67 which, on occasion, may be inserted into the holes 62, 63. It frequently happens that an accident results in a vehicle being thrown or otherwise laterally moved off the road where it is inadvisable or impossible for the tow truck to follow. By reeving the cable of the winch through the snatch block, the cable can be bent at any angle with respect to the truck laterally, to pull an off-the-road damaged vehicle to the rear end of the tow truck which is on the road.

The controls for operating the tilting frame, platform, and winch are diagrammatically shown in FIGURE 7. The pump 70 driven by the truck engine in a conventional manner pumps hydraulic fluid from the sump 71 through the actuating valves 72, 73, 74 upon actuation of control levers 75, 76, 77, respectively, to selectively operate either the winch 31b, the hydraulic cylinders 20 or 42. The hydraulic cylinder 42, when actuated by moving the control lever 77 to the left, will raise the tilting frame until it reaches the height or angle desired. The movement of control lever will result in a flow of fluid through valve 74 to the cylinder 42 to actuate the piston thereof and to raise the tilting frame in a manner which will be understood by those skilled in the art. The hydraulic system, outlined in FIGURE 7, is conventional, forms no part of the invention, and therefore need not be more fully described. A limiting factor in the movement of the tilting frame is the stiff leg and bumper 32, for as the frame is tilted, the leg 32 is lowered until it rests on the road surface.

With the tilting frame in raised position, as shown in FIGURE 6, operation of the lever 76 to the left, as shown in FIGURE 7, will cause fluid to flow through the valve 73 to the hydraulic cylinder 20a, operating the piston thereof to cause the body 22 to slide rearwardly down the ways 15, 18 of the tilting frame until the bevelled portion 78 thereof reaches the road surface, where it comes to rest, the bed 26 forming a ramp and platform upon which a damaged vehicle or other load may be moved for transportation to another location. When the body 22 is in this angular position, as shown in FIGURE 6, with respect to the ground, the stiff leg 32 gives it rigid support midway of its length to take a heavy load, without placing undue strain upon the bed 26 or its supporting framework. When the leg 32 is in the position shown in FIGURE 2, it serves as a rear bumper for the truck.

With the platform 22 in the position shown in FIGURE 6, the winch is operated by moving control lever 75 to the left to extend the cable thereof to the load about to be moved up the ramp 26. Movement of the control lever to the right, as shown in FIGURE 7, will reverse the flow of fluid through the valve to operate the winch under load to pull the load upon the platform. In like manner, reverse operation of the control levers 76 and 77, each in its turn, will actuate hydraulic cylinders 20 and 42, respectively, to pull the platform 22 up the ways of the tilting frame and then will lower the tilting frame to the chassis of the truck. With the load on the truck, the rear ramp 60 will act as a rear stop to prevent accidental discharge of the load. As an additional precaution, chains 79 are provided to anchor the load to the platform.

The control levers 75, 76, 77, for the hydraulic system are positioned at the side of the vehicle substantially midway between the ends thereof so that the operator of the truck can stand beside it and watch the operation as he loads. Only one operator is required for the vehicle, to drive it and load it.

The hydraulic valves, pump and sump are suitably carried by the chassis of the vehicle beneath the tiltable frame and substantially centrally thereof, with flexible conduits leading to and from the winch and hydraulic cylinders as needed.

While the foregoing specification and drawings describe and illustrate a preferred embodiment of the invention, changes in construction, arrangement of parts and design may be made, within the scope of the appended claims, without departing from the spirit of the invention.

We claim:
1. A self loading vehicle comprising a chassis, a frame pivoted to said chassis so as to tilt with respect thereto, and a platform longitudinally movable on said tilting frame and supported at opposite ends thereof on said frame, said frame comprising pairs of reinforcing structural members, one pair of said members having channel portions facing outwardly of said chassis, said platform having a downwardly extending support at its forward end adjacent and outwardly of each of said channels, a roller carried by each support, each roller extending into and resting upon a flange of its respective adjacent channel to support the forward portion of said platform on said frame, another pair of said structural members lying between said first pair, a cross bar supported on said other pair of members adjacent the rear end of said frame and a roller supported on each end of said cross bar, the rear portion of said platform overhanging said rollers and being supported thereby, the ends of said other pair of members carrying a rigid, downwardly extending leg, said leg lying intermediate the ends of said platform when the frame is tilted and the platform is extended thereon, said leg forming an intermediate support for said platform in such position and forming a rear bumper for said vehicle when said platform is in its non-extended position.

2. A vehicle according to claim 1, in which a narrow upstanding ramp extending transversely of said platform is affixed to its upper rear edge, said ramp forming a stop member for a load carried by said platform.

3. A self loading vehicle comprising a chassis, a frame pivoted to said chassis so as to tilt with respect thereto, and a platform longitudinally movable on said tilting frame and supported at opposite ends thereof, on said frame, said frame comprising pairs of reinforcing structural members, said members including at least one pair of longitudinal channel portions, said platform having a downwardly extending support at its forward end, a roller carried by each support, each roller being in engagement with one of said structural members, means on said vehicle maintaining said roller engagement, a cross bar supported on said frame adjacent the rear end of said frame and a roller supported on each end of said cross bar, the rear portion of said platform overhanging said rollers and being supported thereby, and a rigid downwardly extending leg secured to said frame forming a ground support for said frame when in a tilted position, said leg lying intermediate the ends of said platform and forming a rear bumper for said vehicle when said platform is in its non-extended position.

4. A vehicle according to claim 3, in which a narrow upstanding ramp extends transversely of said platform and is affixed to its upper rear edge, said ramp forming a stop member for a load carried by said platform.

References Cited in the file of this patent

UNITED STATES PATENTS

| | | |
|---|---|---|
| 2,091,070 | Girl | Aug. 24, 1937 |
| 2,462,868 | Ives | Mar. 1, 1949 |
| 2,544,456 | Gross | Mar. 6, 1951 |
| 2,621,814 | Lisota | Dec. 16, 1952 |
| 2,763,389 | Heidenrich | Sept. 18, 1956 |
| 2,860,800 | Wilson et al. | Nov. 18, 1958 |